US012073724B2

(12) United States Patent
Wang

(10) Patent No.: US 12,073,724 B2
(45) Date of Patent: *Aug. 27, 2024

(54) SYSTEM AND METHOD FOR DETERMINING CAR TO LANE DISTANCE

(71) Applicant: TuSimple, Inc., San Diego, CA (US)

(72) Inventor: Panqu Wang, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/335,886

(22) Filed: Jun. 15, 2023

(65) Prior Publication Data
US 2023/0326347 A1    Oct. 12, 2023

Related U.S. Application Data

(63) Continuation of application No. 17/647,163, filed on Jan. 5, 2022, now Pat. No. 11,727,811, which is a
(Continued)

(51) Int. Cl.
*G08G 1/16* (2006.01)
*G06T 7/62* (2017.01)
(Continued)

(52) U.S. Cl.
CPC .............. *G08G 1/167* (2013.01); *G06T 7/62* (2017.01); *G06T 7/70* (2017.01); *G06V 20/588* (2022.01);
(Continued)

(58) Field of Classification Search
None
See application file for complete search history.

(56) References Cited

U.S. PATENT DOCUMENTS 6,249,214 B1 *  6/2001  Kashiwazaki .......... G06T 7/223
                                                340/436
6,819,779 B1 * 11/2004  Nichani ................... G06T 7/73
                                                382/104
(Continued)

FOREIGN PATENT DOCUMENTS

CN        101089917 A      12/2007
CN        101894271 A      11/2010
(Continued)

OTHER PUBLICATIONS

Real-Time Lane Region Detection Using a Combination of Geometrical and Image Features. Hernandez et al. (Year: 2016).*
(Continued)

*Primary Examiner* — Delomia L Gilliard
(74) *Attorney, Agent, or Firm* — Perkins Coie LLP

(57) ABSTRACT

A system and method for determining car to lane distance is provided. In one aspect, the system includes a camera configured to generate an image, a processor, and a computer-readable memory. The processor is configured to receive the image from the camera, generate a wheel segmentation map representative of one or more wheels detected in the image, and generate a lane segmentation map representative of one or more lanes detected in the image. For at least one of the wheels in the wheel segmentation map, the processor is also configured to determine a distance between the wheel and at least one nearby lane in the lane segmentation map. The processor is further configured to determine a distance between a vehicle in the image and the lane based on the distance between the wheel and the lane.

20 Claims, 11 Drawing Sheets

Related U.S. Application Data continuation of application No. 16/781,907, filed on Feb. 4, 2020, now Pat. No. 11,227,500, which is a continuation of application No. 15/965,568, filed on Apr. 27, 2018, now Pat. No. 10,586,456.

(51) Int. Cl.
*G06T 7/70* (2017.01)
*G06V 20/56* (2022.01)

(52) U.S. Cl.
CPC ............... *G06T 2207/10016* (2013.01); *G06T 2207/30252* (2013.01)

(56) References Cited

U.S. PATENT DOCUMENTS

| | | | |
|---|---|---|---|
| 8,108,134 | B2 | 1/2012 | Kageyama et al. |
| 9,081,385 | B1 | 7/2015 | Ferguson et al. |
| 9,953,236 | B1 | 4/2018 | Huang et al. |
| 10,147,193 | B2 | 12/2018 | Huang et al. |
| 10,586,456 | B2 | 3/2020 | Wang |
| 11,227,500 | B2 | 1/2022 | Wang |
| 2003/0025597 | A1 | 2/2003 | Schofield |
| 2004/0230375 | A1 | 11/2004 | Matsumoto et al. |
| 2008/0243337 | A1 | 10/2008 | Tsuda |
| 2009/0167864 | A1 | 7/2009 | Unoura |
| 2012/0069185 | A1 | 3/2012 | Stein |
| 2012/0232733 | A1 | 9/2012 | Herbin et al. |
| 2012/0327233 | A1 | 12/2012 | Imai et al. |
| 2013/0063599 | A1 | 3/2013 | Imai et al. |
| 2013/0222127 | A1 | 8/2013 | Avalani |
| 2015/0294165 | A1* | 10/2015 | Hilldore .................... G06T 5/40 382/104 |
| 2015/0294168 | A1 | 10/2015 | Artan et al. |
| 2016/0203720 | A1 | 7/2016 | Lee |
| 2017/0124877 | A1 | 5/2017 | Sim |
| 2017/0177953 | A1 | 6/2017 | Stein |
| 2018/0093664 | A1 | 4/2018 | Kim et al. |
| 2018/0144636 | A1 | 5/2018 | Becker |
| 2018/0260651 | A1 | 9/2018 | Wang et al. |
| 2018/0260956 | A1 | 9/2018 | Huang et al. |
| 2018/0276760 | A1 | 9/2018 | Yu |
| 2018/0324365 | A1* | 11/2018 | Choi .................... H04N 5/2628 |
| 2018/0365502 | A1 | 12/2018 | Stein |
| 2018/0365835 | A1 | 12/2018 | Yan et al. |
| 2019/0101927 | A1 | 4/2019 | Zhao et al. |
| 2019/0258878 | A1 | 8/2019 | Koivisto et al. |
| 2019/0286916 | A1 | 9/2019 | Yan et al. |
| 2019/0294179 | A1 | 9/2019 | Stein et al. |
| 2019/0333389 | A1 | 10/2019 | Wang |
| 2019/0351824 | A1* | 11/2019 | Kim ..................... B60W 50/14 |
| 2020/0082180 | A1 | 3/2020 | Wang |
| 2020/0184233 | A1 | 6/2020 | Berberian |

FOREIGN PATENT DOCUMENTS

| | | |
|---|---|---|
| CN | 104129389 A | 11/2014 |
| CN | 104590258 A | 5/2015 |
| CN | 104916165 A | 9/2015 |
| CN | 106627571 A | 5/2017 |
| CN | 106886801 A | 6/2017 |
| CN | 107909047 A | 4/2018 |
| DE | 10 2010 020 688 A1 | 5/2011 |
| EP | 2525335 A2 | 11/2012 |
| EP | 3 121 761 A1 | 1/2017 |
| GB | 2550485 A | 11/2017 |
| JP | H09-35059 A | 2/1997 |
| JP | 2001-357387 A | 12/2001 |
| KR | 10-2013-0120041 A | 11/2013 |
| KR | 10-1479870 B1 | 1/2015 |
| KR | 10-2017-0055738 A | 5/2017 |
| WO | WO 2011/114814 | 9/2011 |
| WO | WO 2014/007052 | 1/2014 |

OTHER PUBLICATIONS

U.S. Appl. No. 15/924,249, filed Mar. 18, 2018, Zhipeng et al.
U.S. Appl. No. 16/129,040, filed Sep. 12, 2018, Wang et al.
Lai, Chih-Chiun, and Wen-Hsiang Tsai. "Estimation of moving vehicle locations using wheel shape information in single 2-D lateral vehicle images by 3-D computer vision techniques." *Robotics and Computer-Integrated Manufacturing* 15.2 (1999): 111-120.
Zeisler, Jöran, et al. "Vision Based Lane Change Detection Using True Flow Features." *2017 IEEE 20th International Conference on Intelligent Transportation Systems (ITSC)*. IEEE, 2017.
International Search Report and Written Opinion received in PCT/US2019/29456 mailed on Jul. 10, 2019.
International Preliminary Report on Patentability received in PCT/US2019/29456 dated Oct. 27, 2020.
Extended European Search Report received in EP application No. 19793178.5, mailed Dec. 22, 2021.
Office Action Search Report received in Chinese Application No. 201980028505.X, dated Apr. 18, 2023.
Office Action received in Chinese Application No. 201980028505.X, dated Apr. 20, 2023.
Australian office action received in AU application No. 2019260775, dated Feb. 24, 2024.
Search Report received in CN Application No. 201980028505X, dated Nov. 17, 2023.

\* cited by examiner

SYSTEM AND METHOD FOR DETERMINING CAR TO LANE DISTANCE

CROSS-REFERENCE TO RELATED APPLICATION(S)

This application is a continuation of U.S. patent application Ser. No. 17/647,163, filed Jan. 5, 2022, which is a continuation of U.S. patent application Ser. No. 16/781,907, filed Feb. 4, 2020, which is a continuation of U.S. patent application Ser. No. 15/965,568, filed Apr. 27, 2018, each of which is hereby incorporated by reference in its entirety. Any and all priority claims identified in the Application Data Sheet, or any correction thereto, are hereby incorporated by reference under 37 CFR § 1.57.

BACKGROUND

Technological Field

The described technology generally relates to systems and methods for determining car to lane distance, and more particularly, to image processing techniques for determining the distance between a car and a lane.

Description of the Related Technology

In autonomous driving systems, the successful perception and prediction of the surrounding driving environment and traffic participants are crucial for making correct and safe decisions for control of the autonomous or host vehicle. Visual perception techniques may include object recognition, two-dimensional (2D) or three-dimensional (3D) object detection and scene understanding. With the assistance of fast-developing deep learning techniques and computational power (such as graphics processing units (GPUs)), these visual perception techniques can be successfully applied for use with autonomous or host vehicles. One aspect of scene understanding may include the determination of the location of other vehicles within the environment (e.g., the location of a vehicle with respect to lane markers).

SUMMARY OF CERTAIN INVENTIVE ASPECTS

One inventive aspects is an in-vehicle control system, comprising: a camera configured to generate an image; a processor; and a computer-readable memory in communication with the processor and having stored thereon computer-executable instructions to cause the processor to: receive the image from the camera, generate a wheel segmentation map representative of one or more wheels detected in the image, generate a lane segmentation map representative of one or more lanes detected in the image, for at least one of the wheels in the wheel segmentation map, determine a distance between the wheel and at least one nearby lane in the lane segmentation map, and determine a distance between a vehicle in the image and the lane based on the distance between the wheel and the lane.

Another aspect is a non-transitory computer readable storage medium having stored thereon instructions that, when executed, cause at least one computing device to: receive an image from a camera installed on an ego vehicle; generate a wheel segmentation map representative of one or more wheels detected in the image; generate a lane segmentation map representative of one or more lanes detected in the image; for at least one of the wheels in the wheel segmentation map, determine a distance between the wheel and at least one nearby lane in the lane segmentation map; and determine a distance between a vehicle in the image and the lane based on the distance between the wheel and the lane.

Yet another aspect is a method for determining the distance between a vehicle and a lane, comprising: receiving an image from a camera installed on an ego vehicle; generating a wheel segmentation map representative of one or more wheels detected in the image; generating a lane segmentation map representative of one or more lanes detected in the image; for at least one of the wheels in the wheel segmentation map, determining a distance between the wheel and at least one nearby lane in the lane segmentation map; and determining a distance between a vehicle in the image and the lane based on the distance between the wheel and the lane.

DETAILED DESCRIPTION OF THE CERTAIN INVENTIVE EMBODIMENTS

Introduction to In-Vehicle Control Systems

In the following description, for purposes of explanation, numerous specific details are set forth in order to provide a thorough understanding of the various embodiments. It will be evident, however, to one of ordinary skill in the art that the various embodiments may be practiced without these specific details.

As described in various example embodiments, a system and method for determining car to lane distance are described herein. An example embodiment disclosed herein can be used in the context of an in-vehicle control system 150 in a vehicle ecosystem 101. In one example embodiment, an in-vehicle control system 150 with an image processing module 200 resident in a vehicle 105 can be configured like the architecture and ecosystem 101 illustrated in FIG. 1. However, it will be apparent to those of ordinary skill in the art that the image processing module 200 described herein can be implemented, configured, and used in a variety of other applications and systems as well.

Figure 1:
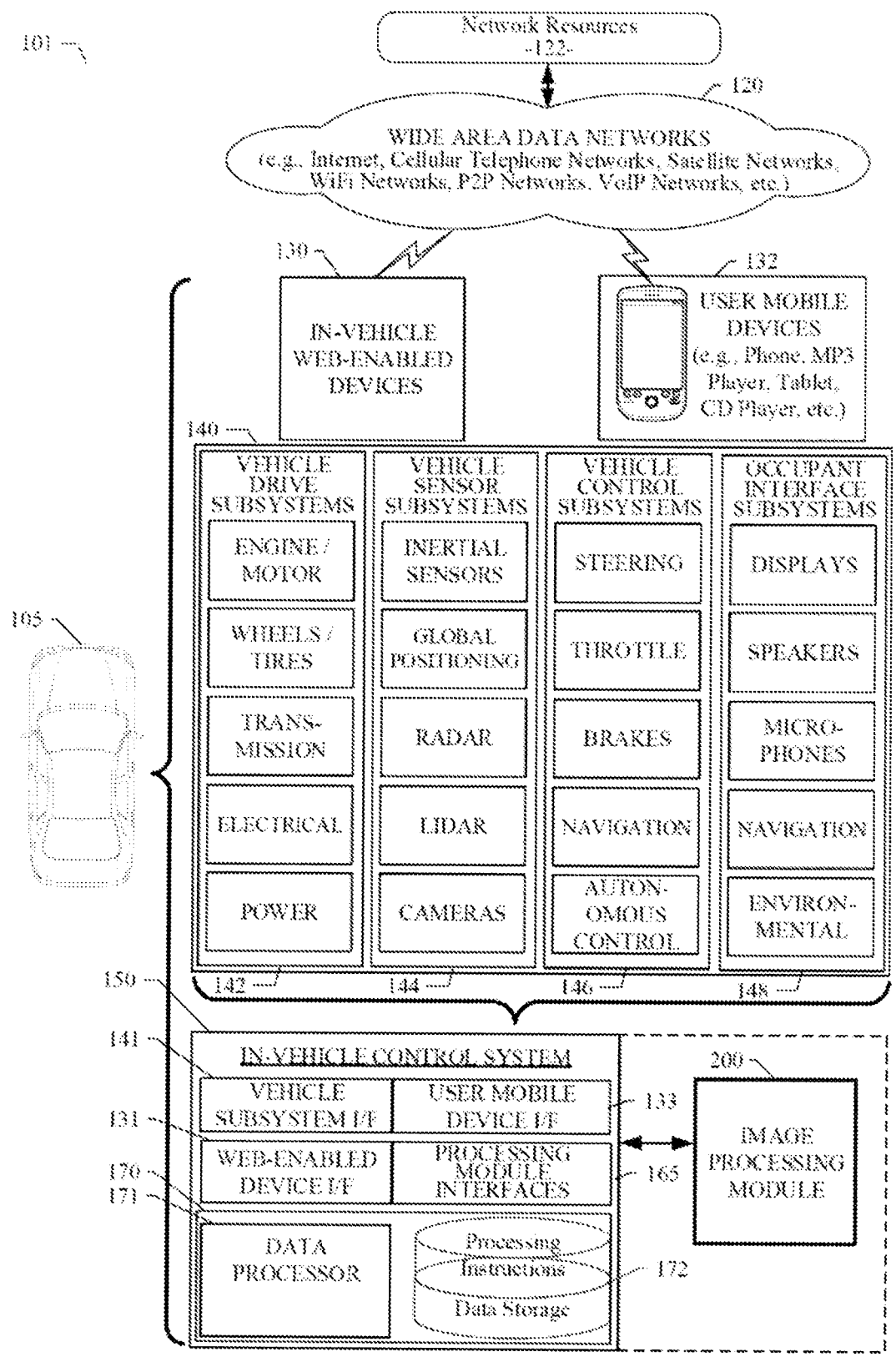
FIG. 1 is a block diagram illustrating an example ecosystem including an in-vehicle control system and an image processing module in accordance with aspects of this disclosure.

With continuing reference to FIG. 1, a block diagram illustrates an example ecosystem 101 in which an in-vehicle control system 150 and an image processing module 200 of an example embodiment can be implemented. These components are described in more detail below. Ecosystem 101 includes a variety of systems and components that can generate and/or deliver one or more sources of information/data and related services to the in-vehicle control system 150 and the image processing module 200, which can be installed in the vehicle 105. For example, a camera installed in the vehicle 105, as one of the devices of vehicle subsystems 140, can generate image and timing data that can be received by the in-vehicle control system 150. The in-vehicle control system 150 and the image processing module 200 executing therein can receive this image and timing data input. As described in more detail below, the image processing module 200 can process the image input and extract object features, which can be used by an autonomous vehicle control subsystem, as another one of the subsystems of vehicle subsystems 140. The autonomous vehicle control subsystem, for example, can use the real-time extracted object features to safely and efficiently navigate and control the vehicle 105 through a real world driving environment while avoiding obstacles and safely controlling the vehicle.

In an example embodiment as described herein, the in-vehicle control system 150 can be in data communication with a plurality of vehicle subsystems 140, all of which can reside in a user's vehicle 105. A vehicle subsystem interface 141 is provided to facilitate data communication between the in-vehicle control system 150 and the plurality of vehicle subsystems 140. The in-vehicle control system 150 can include a data processor 171 configured to execute the image processing module 200 for processing image data received from one or more of the vehicle subsystems 140. The data processor 171 can be combined with a data storage device 172 as part of a computing system 170 in the in-vehicle control system 150. The data storage device 172 can be used to store data, processing parameters, and data processing instructions. A processing module interface 165 can be provided to facilitate data communications between the data processor 171 and the image processing module 200. In various example embodiments, a plurality of processing modules, configured similarly to image processing module 200, can be provided for execution by data processor 171. As shown by the dashed lines in FIG. 1, the image processing module 200 can be integrated into the in-vehicle control system 150, optionally downloaded to the in-vehicle control system 150, or deployed separately from the in-vehicle control system 150.

The in-vehicle control system 150 can be configured to receive or transmit data to/from a wide-area network 120 and network resources 122 connected thereto. An in-vehicle web-enabled device 130 and/or a user mobile device 132 can be used to communicate via network 120. A web-enabled device interface 131 can be used by the in-vehicle control system 150 to facilitate data communication between the in-vehicle control system 150 and the network 120 via the in-vehicle web-enabled device 130. Similarly, a user mobile device interface 133 can be used by the in-vehicle control system 150 to facilitate data communication between the in-vehicle control system 150 and the network 120 via the user mobile device 132. In this manner, the in-vehicle control system 150 can obtain real-time access to network resources 122 via network 120. The network resources 122 can be used to obtain processing modules for execution by data processor 171, data content to train internal neural networks, system parameters, or other data.

The ecosystem 101 can include a wide area data network 120. The network 120 represents one or more conventional wide area data networks, such as the Internet, a cellular telephone network, satellite network, pager network, a wireless broadcast network, gaming network, WiFi network, peer-to-peer network, Voice over IP (VoIP) network, etc. One or more of these networks 120 can be used to connect a user or client system with network resources 122, such as websites, servers, central control sites, or the like. The network resources 122 can generate and/or distribute data, which can be received in vehicle 105 via in-vehicle web-enabled devices 130 or user mobile devices 132. The network resources 122 can also host network cloud services, which can support the functionality used to compute or assist in processing image input or image input analysis. Antennas can serve to connect the in-vehicle control system 150 and the image processing module 200 with the data network 120 via cellular, satellite, radio, or other conventional signal reception mechanisms. Such cellular data networks are currently available (e.g., Verizon™, AT&T™, T-Mobile™, etc.). Such satellite-based data or content networks are also currently available (e.g., SiriusXM™, HughesNet™, etc.). The broadcast networks, such as AM/FM radio networks, pager networks, UHF networks, gaming networks, WiFi networks, peer-to-peer networks, Voice over IP (VoIP) networks, and the like are also available. Thus, the in-vehicle control system 150 and the image processing module 200 can receive web-based data or content via an in-vehicle web-enabled device interface 131, which can be used to connect with the in-vehicle web-enabled device receiver 130 and network 120. In this manner, the in-vehicle control system 150 and the image processing module 200 can support a variety of network-connectable in-vehicle devices and systems from within a vehicle 105.

As shown in FIG. 1, the in-vehicle control system 150 and the image processing module 200 can also receive data, image processing control parameters, and training content from user mobile devices 132, which can be located inside or proximately to the vehicle 105. The user mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, image processing control parameters, and content for the in-vehicle control system 150 and the image processing module 200. As shown in FIG. 1, the mobile devices 132 can also be in data communication with the network cloud 120. The mobile devices 132 can source data and content from internal memory components of the mobile devices 132 themselves or from network resources 122 via network 120. Additionally, mobile devices 132 can themselves include a GPS data receiver, accelerometers, WiFi triangulation, or other geo-location sensors or components in the mobile device, which can be used to determine the real-time geo-location of the user (via the mobile device) at any moment in time. In any case, the in-vehicle control system 150 and the image processing module 200 can receive data from the mobile devices 132 as shown in FIG. 1.

Referring still to FIG. 1, the example embodiment of ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the in-vehicle control system 150 via vehicle subsystem interface 141 may include information about the state of one or more of the components or subsystems of the vehicle 105. In particular, the data signals, which can be communicated from the vehicle operational subsystems 140 to a Controller Area Network (CAN) bus of the vehicle 105, can be received and processed by the in-vehicle control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications; however, such network communications are not required.

Referring still to FIG. 1, the example embodiment of ecosystem 101, and the vehicle operational subsystems 140 therein, can include a variety of vehicle subsystems in support of the operation of vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 105 based on the determined information. While in autonomous mode, the vehicle 105 may be configured to operate without human interaction.

The vehicle 105 may include various vehicle subsystems such as a vehicle drive subsystem 142, vehicle sensor subsystem 144, vehicle control subsystem 146, and occupant interface subsystem 148. As described above, the vehicle 105 may also include the in-vehicle control system 150, the computing system 170, and the image processing module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the vehicle 105 may be standard tires. The wheels of the vehicle 105 may be configured in various formats, including a unicycle, bicycle, tricycle, or a four-wheel format, such as on a car or a truck, for example. Other wheel geometries are possible, such as those including six or more wheels. Any combination of the wheels of vehicle 105 may be operable to rotate differentially with respect to other wheels. The term wheel may generally refer to a structure comprising a rim configured to be fixedly attached to a tire, which is typically formed of rubber. Optionally, a wheel may include a hubcap attached to an outer surface of the rim or the tire may be exposed to the environment without the inclusion of a hubcap. As used herein, the detection and/or segmentation of a wheel within an image may include the detection of the entire wheel/tire combination, including the rubber tire and the central wheel, when visible.

The wheels of a given vehicle may represent at least one wheel that is fixedly coupled to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and one or more cameras or image capture devices. The vehicle sensor subsystem 144 may also include sensors configured to monitor internal systems of the vehicle 105 (e.g., an 02 monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. In an example embodiment, the laser range finder/LIDAR unit may include one or more laser sources, a laser scanner, and one or more detectors, among other system components. The laser range finder/LIDAR unit can be configured to operate in a coherent (e.g., using heterodyne detection) or an incoherent detection mode. The cameras may include one or more devices configured to capture a plurality of images of the environment of the vehicle 105. The cameras may be still image cameras or motion video cameras.

The vehicle control system 146 may be configured to control operation of the vehicle 105 and its components. Accordingly, the vehicle control system 146 may include various elements such as a steering unit, a throttle, a brake unit, a navigation unit, and an autonomous control unit.

The steering unit may represent any combination of mechanisms that may be operable to adjust the heading of vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the image processing module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the image processing module 200, the GPS transceiver, the RADAR, the LIDAR, the cameras, and other vehicle subsystems to determine the driving path or trajectory for the vehicle 105. The vehicle control system 146 may additionally or alternatively include components other than those shown and described.

Occupant interface subsystems 148 may be configured to allow interaction between the vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, capabilities for a user/occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide capabilities for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, or 4G cellular communication, such as WiMAX or LTE. Alternatively, the wireless communication system may communicate with a wireless local area network (WLAN), for example, using WIFI®. In some embodiments, the wireless communication system 146 may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 142, the vehicle sensor subsystem 144, the vehicle control subsystem 146, and the occupant interface subsystems 148.

In addition to the processing instructions, the data storage device 172 may store data such as image processing parameters, training data, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 142, the vehicle sensor subsystem 144, and the vehicle control subsystem 146), as well as from the occupant interface subsystem 148. For example, the computing system 170 may use input from the vehicle control system 146 in order to control the steering unit to avoid an obstacle detected by the vehicle sensor subsystem 144 and the image processing module 200, move in a controlled manner, or follow a path or trajectory based on output generated by the image processing module 200. In an example embodiment, the computing system 170 can be operable to provide control over many aspects of the vehicle 105 and its subsystems.

Although FIG. 1 shows various components of vehicle 105, e.g., vehicle subsystems 140, computing system 170, data storage device 172, and image processing module 200, as being integrated into the vehicle 105, one or more of these components could be mounted or associated separately from the vehicle 105. For example, data storage device 172 could, in part or in full, exist separate from the vehicle 105. Thus, the vehicle 105 could be provided in the form of device elements that may be located separately or together. The device elements that make up vehicle 105 could be communicatively coupled together in a wired or wireless fashion.

Additionally, other data and/or content (denoted herein as ancillary data) can be obtained from local and/or remote sources by the in-vehicle control system 150 as described above. The ancillary data can be used to augment, modify, or train the operation of the image processing module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein.

In a particular embodiment, the in-vehicle control system 150 and the image processing module 200 can be implemented as in-vehicle components of vehicle 105. In various example embodiments, the in-vehicle control system 150 and the image processing module 200 in data communication therewith can be implemented as integrated components or as separate components. For example, the image processing module 200 can be included as a set of instructions stored in a non-transitory computer readable medium, such as the data storage device 172, for causing the data processor 171 to perform various image processing functionality. In an example embodiment, the software components of the in-vehicle control system 150 and/or the image processing module 200 can be dynamically upgraded, modified, and/or augmented by use of the data connection with the mobile devices 132 and/or the network resources 122 via network 120. The in-vehicle control system 150 can periodically query a mobile device 132 or a network resource 122 for updates or updates can be pushed to the in-vehicle control system 150.

Car to Lane Distance Determination

In the various example embodiments disclosed herein, a system and method for determining the distance between a vehicle and a nearby lane marker are provided. The distance between a given vehicle within the field of view of a camera of the ego-vehicle and the nearest lane(s) to the given vehicle can be used as input information to a number of different estimation, prediction, and/or detection technique. As used herein, the term "ego-vehicle" is generally used to refer to the vehicle on which the described car to lane distance techniques are run (e.g., the vehicle 105 illustrated in FIG. 1).

The distance between a vehicle and its nearby lane(s) can provide crucial information for accurate vehicle pose estimation, vehicle intention prediction, or lane-changing event detection. Accurate car-lane distance can be an important determination for the autonomous driving system, as this distance can provide direct information which can be used to determine one or more of: a) the pose/direction of the vehicle (e.g., by calculating the angle between the vehicle and its nearby lane(s)), b) the driving pattern of the vehicle (e.g., does the vehicle prefer to drive along specific side of its lane—is the vehicle zigzagging within its lane, etc.), c) a prediction of the vehicle's intention (e.g., is the vehicle going to change lanes—is the vehicle going to exit the highway, etc.). Accordingly, aspects of this disclosure relate to the determination of the distance between visible vehicles and the nearest lane(s). In certain aspects, as described in detail below, the location of a vehicle's wheels with respect to the lane markers can be used to determine the distance between the vehicle and the lanes.

In order to determine the distance between a vehicle and its nearby lane(s) based on an image captured by the a camera an ego-vehicle (e.g., using a camera from the vehicle sensor subsystem 144), the image processing module 200 determines the locations of each of the vehicle and the lanes within the image. One technique which may be used to determine the location of a vehicle within a captured image includes the use of deep learning-based object detection module, in which a two-dimensional (2D) bounding box is generated for each of the detected vehicles within the image. However, due to the perspective change in the 2D image obtained from a camera, the 2D bounding boxes alone may not provide an accurate representation of the distance between the vehicles and the lane(s). For example, FIG. 2A is an example image obtained from a camera located on an ego vehicle in accordance with aspects of this disclosure.

Figure 2A:
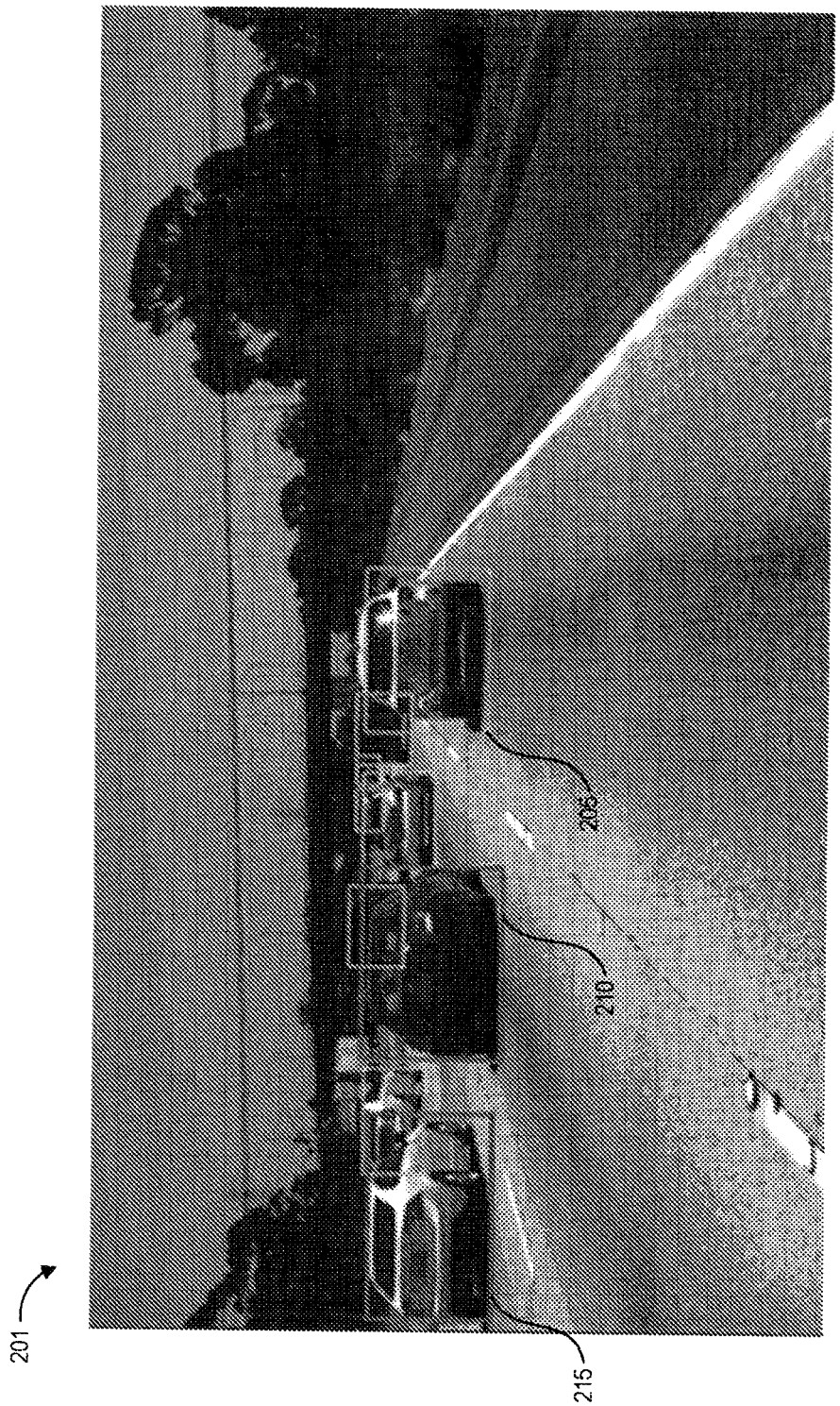
FIG. 2A is an example image obtained from a camera located on an ego vehicle in accordance with aspects of this disclosure.

Based on the image 201 of FIG. 2A, a processor, executing the image processing module 200, may generate bounding boxes 205, 210, 215 for each of the vehicles detected within the image 201. In certain embodiments, each of the bounding boxes 205, 210, 215 may represent a 2D rectangular area of the image in which the pixels of the corresponding detected vehicle are located. There may be certain limitations to determining the distance between a given one of the detected vehicles and the nearby lane(s) based on the bounding boxes 205, 210, 215. For example, as shown in FIG. 2A, bounding box 205 may be wider than the width of the corresponding vehicle. Thus, the distance between the edges of the bounding box 205 and the nearby lanes may be lower than the ground truth distance between the vehicle and the lanes. Further, as will be understood, due to the perspective of the camera, certain bounding boxes 210 and 215 may be closer to the nearby lane(s) than the ground truth distance.

For example, although the vehicle corresponding to the bounding box 215 is located within its lane, the right side of bounding box 215 overlaps the nearby right-side lane due to the perspective of the vehicle.

Accordingly, aspects of this disclosure relate to techniques for determining the distance between a detected vehicle and its nearby lane(s) which address at least some of the above described limitations. One technique may include determining a three-dimensional (3D) bounding box for at least some of the detected vehicles in the image 201 captured via a camera on the ego vehicle. A 3D bounding box may provide rectangular cuboid bounding the vehicle and defining eight corners and the direction of travel of the vehicle. Thus, the generation of a 3D bounding box may overcome reduce the perspective distortions in calculating the distance between a vehicle and its nearby lane(s). However, the calculation of a 3D bounding box (e.g., using only a 2D source image such as image 201) may require significant resources to calculate since the 3D bounding box calculation can include correct annotation of the 3D bounding box, which may require accurate measurement of extrinsic and intrinsic camera parameter as well as the motion of ego-vehicle. In certain implementations, sufficiently accurate measurement of extrinsic and intrinsic camera parameter and the motion of ego-vehicle may not be possible due to hardware and/or software limitations of the vehicle ecosystem 101. Additionally, it may be difficult to obtain the ground truth (e.g., image recognition training data and measurements of vehicle position) of the vehicles in an image 201 in order to properly train image processing module 200 to generate sufficiently accurate 3D bounding boxes.

Another technique for determining the distance between a detected vehicle and its nearby lane(s) includes detecting and identifying the wheels of vehicle in a received image 201 and using the detected wheels to measure the distance between the vehicle and the nearby lane(s). The use of a vehicles wheel location to determine car to lane distance may improve the distance measurement over other techniques (e.g., 2D bounding box based techniques) since the wheels are in contact with the road surface. Due to the contact between the wheels and the road surface, any 2D perspective distortions are substantially reduced or even eliminated from the distance calculation. The location of the wheels on a vehicle can also provide robust estimate of the vehicle pose since vehicles typically have 4 or more wheels to serve as reference points. Additionally, the image processing module 200 may be able to more easily detect the wheels of a vehicle than produce a 3D bounding box using a deep-learning based wheel segmentation module.

Figure 2B:
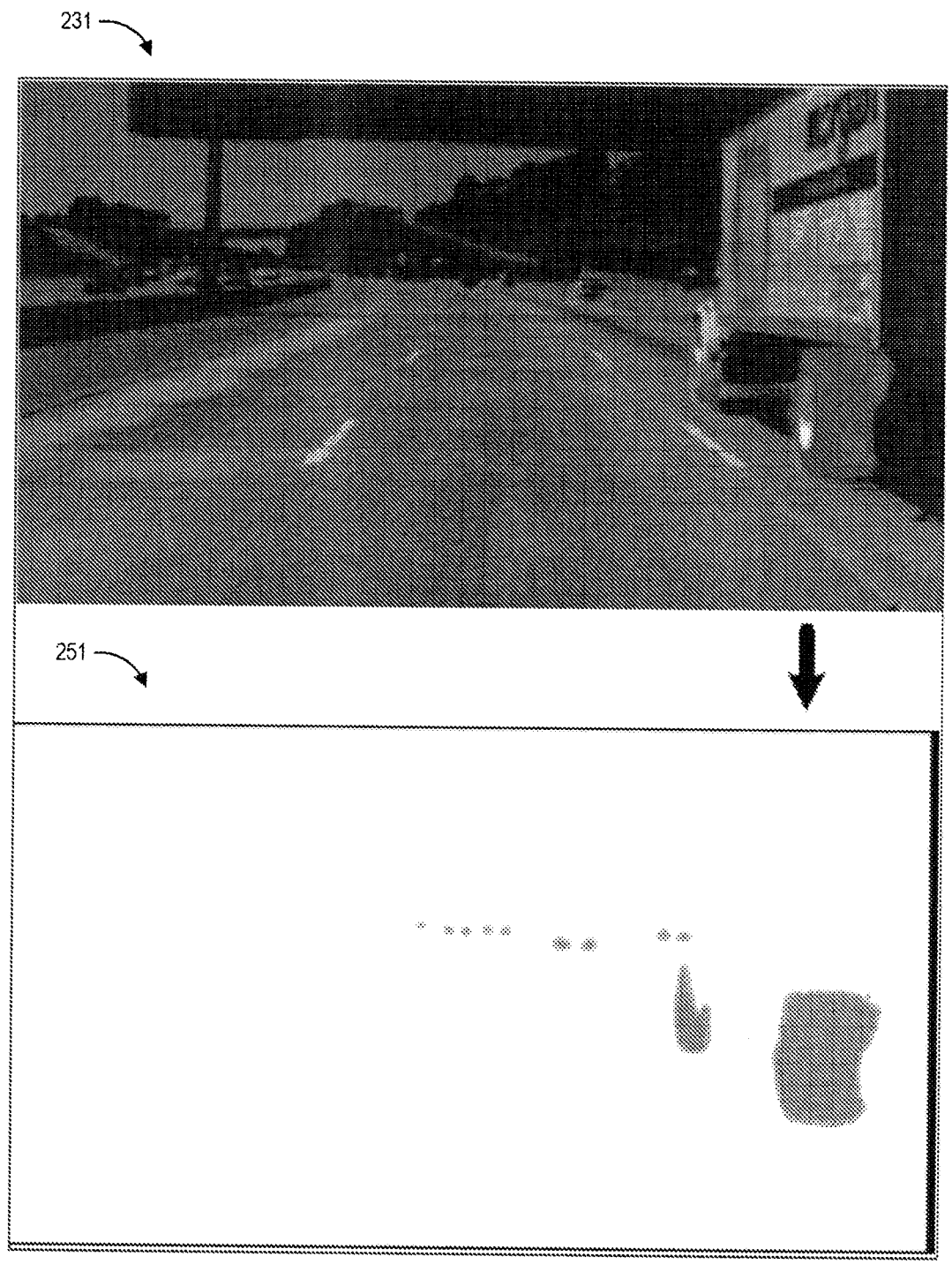
FIG. 2B includes another example image obtained from a camera and a wheel segmentation map generated based on the example image in accordance with aspects of this disclosure.

In certain embodiments, the image processing module 200 may be configured to detect wheels from within a received image 201 and produce a segmentation map indicative of the location(s) of the wheel(s) detected in the image 201. FIG. 2B includes another example image obtained from a camera and a wheel segmentation map generated based on the example image in accordance with aspects of this disclosure. As shown in FIG. 2B, the image 231 received from a camera may include a number of vehicles including wheels which may be segmented by the image processing module 200. The wheel segmentation process may produce a wheel segmentation map 251 including an indication of the pixels representative of wheel(s) in the received image 231. As shown in FIG. 2B, the identified wheels may correspond to all visible portions of the wheels in the image 231, including the tires and central wheel or hubcap. As will be described in detail below, the pixels of a given wheel which are closest to the bottom of the image may be determined to be in contact with the road surface.

The image processing module 200 may also be configured to detect the lane(s) within a received image 201 using, for example, a deep learning-based lane detection technique. The lane detection technique may produce a segmentation map indicative of the location(s) of the lane(s) detected in the image 201. Each of the segmentation maps may comprise pixel level representations of the detected wheel(s) and lane(s) respectively located within the wheel segmentation and lane segmentation maps.

Figure 3:
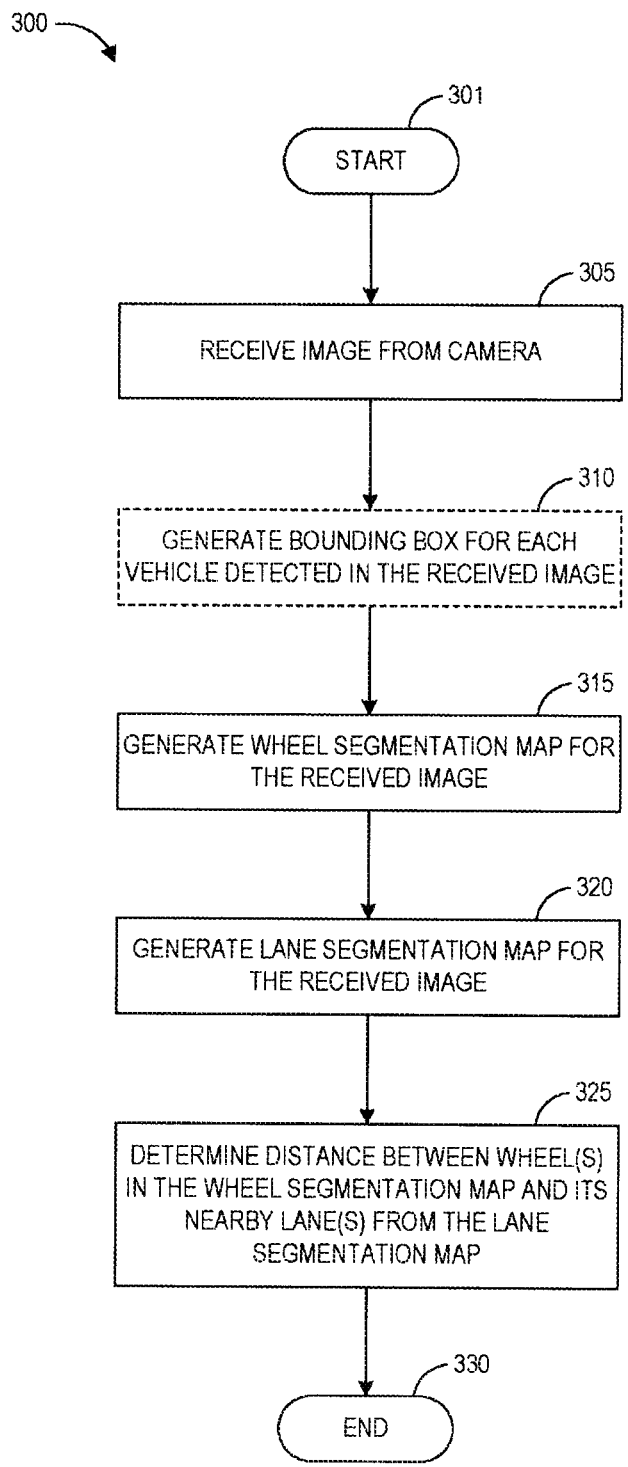
FIG. 3 is an example flow-chart illustrating an example method for determining the distance between a vehicle and lane(s) in accordance with aspects of this disclosure.

FIG. 3 is an example flow-chart illustrating an example method for determining the distance between a vehicle and lane(s) in accordance with aspects of this disclosure. The method 300 illustrated in FIG. 3 may be performed by an in-vehicle control system (such as the in-vehicle control system 150 of FIG. 1) or component(s) thereof. For example, the steps of method 300 illustrated in FIG. 3 may be performed by processor(s) and/or other component(s) of an in-vehicle control system or associated system(s). For convenience, the method 300 is described as performed by the processor of the in-vehicle control system.

The method 300 begins at block 301. At block 305, the processor receives an image from a camera, which may be included as a component of the vehicle sensor subsystem 144. The image may include one or more vehicles and one or more lane markings dividing the road into a plurality of lanes. At optional block 310, the processor generates a bounding box for each vehicle detected in the received image. This may include, for example, detecting pixels included in at least one of vehicle in the image and determining 2D boundaries which encompass a majority of the pixels included in the vehicle. While in certain embodiments, the processor may use the bounding box to associate one or more detected wheels with a given vehicle, in other embodiments, the processor may be configured to determine the distance between a detected wheel and a lane without the use of a bounding box.

At block 315, the processor generates a wheel segmentation map for the received image. The wheel segmentation map may include an indication of each pixel within the image that is detected to be a portion of a wheel. At block 320, the processor generates a lane segmentation map for the received image. The lane segmentation map may include an indication of each pixel within the image that is detected to be a portion of a lane marking.

At block 325, the processor determines the distance between the wheel(s) in the wheel segmentation map and the wheel(s) nearby lane(s) from the lane segmentation map. In certain implementations, the distance between a wheel and a nearby lane may be determined based on the number of pixels located between the wheel in the wheel segmentation map and the lane in the lane segmentation map. As will be described below, the processor may use the determined distance between a wheel and a lane as an indication of the distance between a vehicle and the lane (e.g., a vehicle bounded by a bounding box overlapping with the wheel in the wheel segmentation map). The method ends at block 330.

Figure 4A:
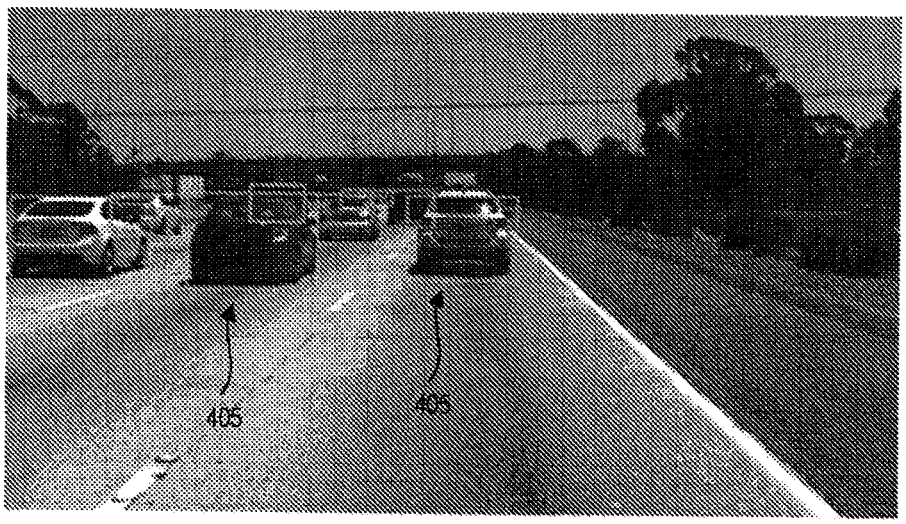
FIGS. 4A-4C illustrate various images and segmentation maps which may be generated during the method of FIG. 3.
Figure 4B:
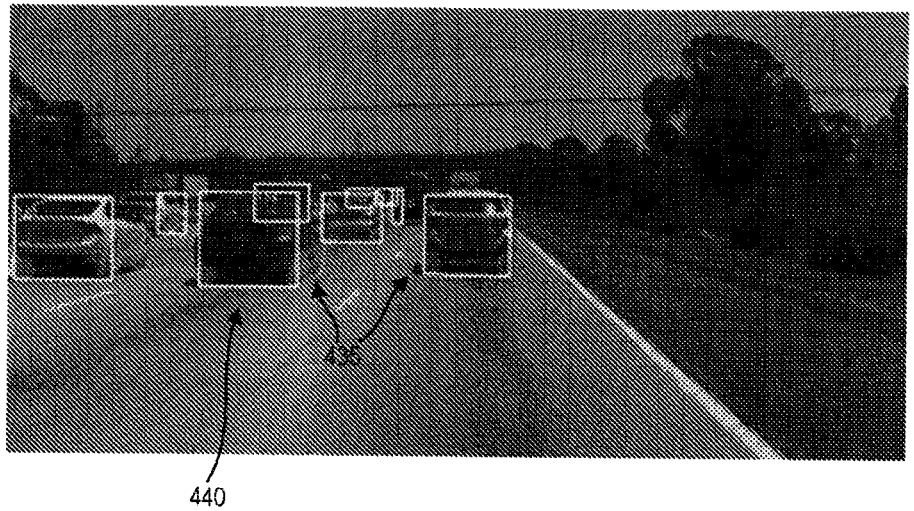
Figure 4C:
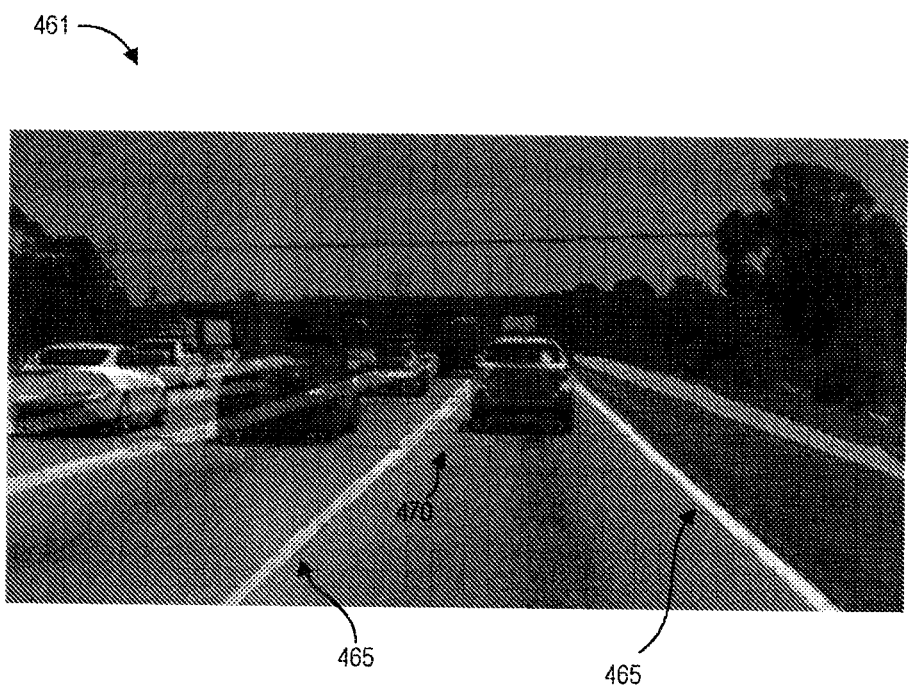

FIGS. 4A-4C illustrate various images and segmentation maps which may be generated during the method 300 of FIG. 3. In particular, FIG. 4A is an example 2D bounding box map corresponding to a received image in accordance with aspects of this disclosure. FIG. 4B is an example wheel segmentation map corresponding to a received image in accordance with aspects of this disclosure. FIG. 4B also illustrates the modified bounding box of the detected vehicles. FIG. 4C is an example lane segmentation map corresponding to a received image in accordance with aspects of this disclosure.

Referring first to FIG. 4A, the 2D bounding box map 401 may include a plurality of bounding boxes 405 which bound and/or surround the pixels of each of the detected vehicles within the image. The bounding box map 401 may be a map generated by the processor during step 310 of method 300. In FIG. 4B, the wheel segmentation map 431 includes a plurality of groups of pixels representing the wheels 435 as generated, for example, by step 315 of method 300. Also shown in the wheel segmentation map 431 is a set of trapezoids 440 which may be generated based on the detected wheels 435. Technique(s) related to generating the trapezoids 440 will be described in detail below.

FIG. 4C illustrates a lane segmentation map 461 including groups of pixels representing the lanes 465 as generated, for example, by step 320 of method 300. Also shown in FIG. 4C is one embodiment of the distance values 470 which may be calculated at step 325 of method 300. While the distance values 470 are illustrated as being overlaid on the lane segmentation map 461 in the embodiment of FIG. 4C, depending on the embodiment, these values may not be positioned on the map, but rather, provided as an output of the method 300. Thus, the distance values can be used by the in-vehicle control system to determine, for example, a prediction of the behavior of the corresponding vehicle (e.g., by analyzing changes in the distance between the vehicle and its nearby lane(s) over time).

Figure 5A:
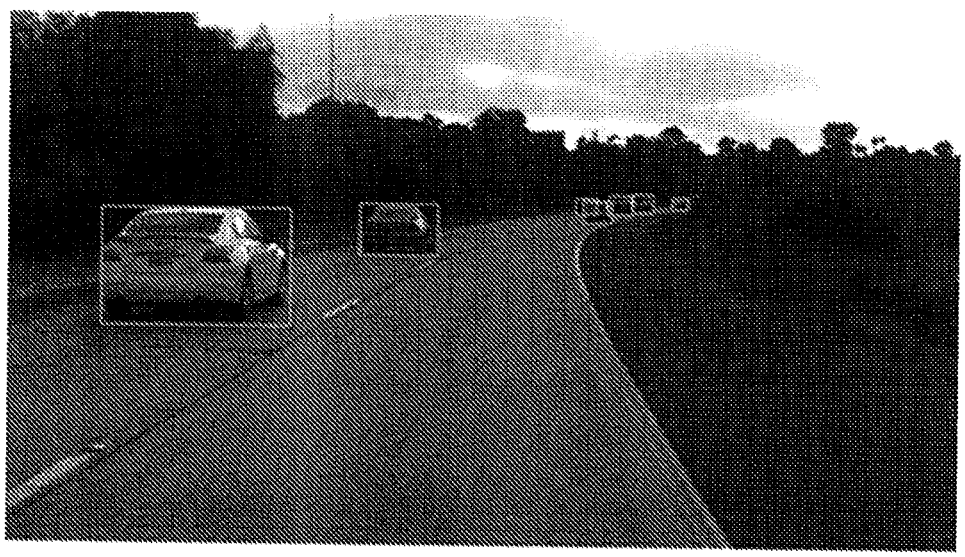
FIGS. 5A-5C illustrate another embodiment of images and segmentation maps which may be generated during the method of FIG. 3.
Figure 5B:
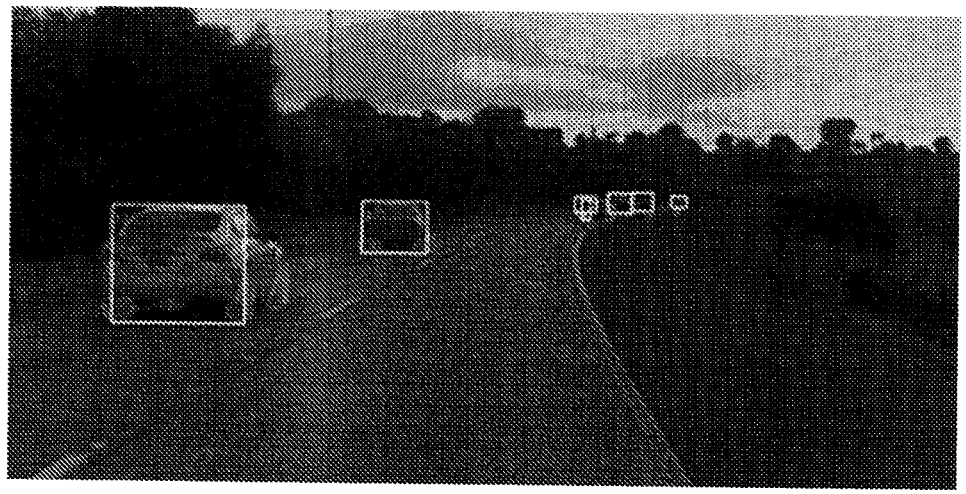
Figure 5C:
Figure 6A:
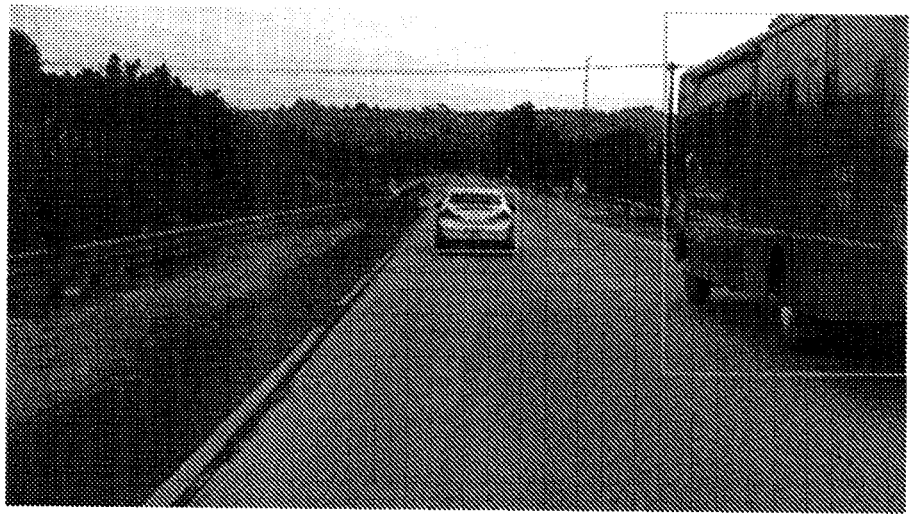
FIGS. 6A-6C illustrate yet another embodiment of images and segmentation maps which may be generated during the method of FIG. 3.
Figure 6B:
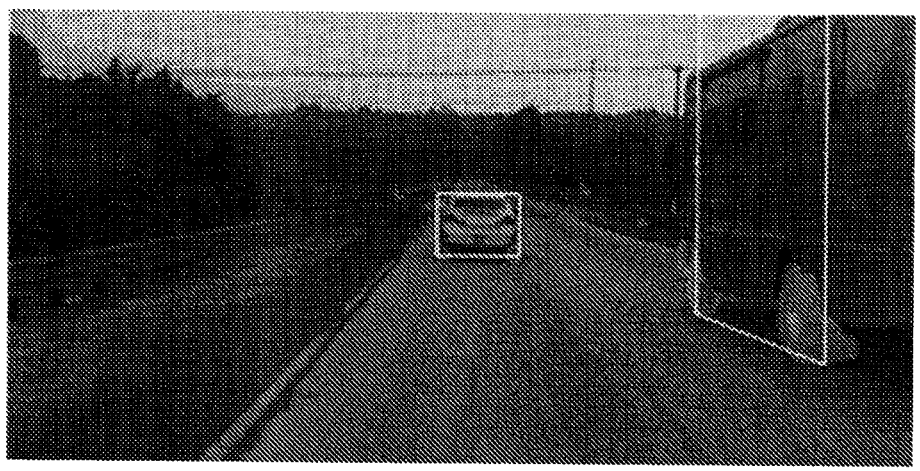
Figure 6C:
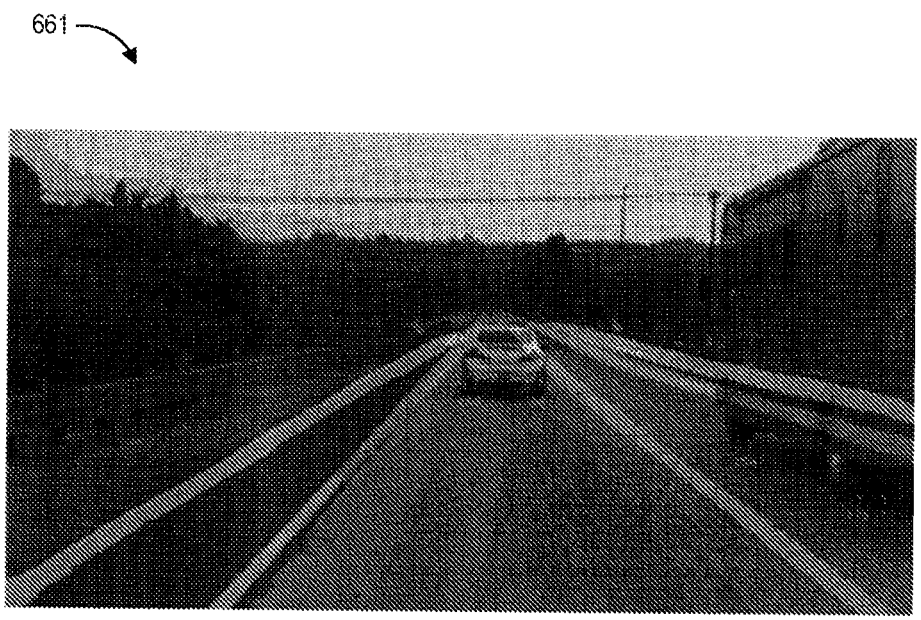

FIGS. 5A-5C and 6A-6C illustrate additional embodiments of images and segmentation maps which may be generated during the method 300 of FIG. 3. In particular, FIGS. 5A and 6A provide example 2D bounding box maps 501, 601 corresponding to received images, FIGS. 5B and 6B provide example wheel segmentation maps 531, 631 corresponding to the received images, and FIGS. 5C and 6C provide example lane segmentation maps 561, 661 corresponding to the received images. FIGS. 5A-5C illustrate an embodiment where the lanes curve while FIGS. 6A-6C illustrate an embodiment where one of a vehicle's rear wheels is occluded. Since the remaining features of FIGS. 5A-5C and 6A-6C are substantially similar to the features of FIGS. 4A-4C, additional reference numerals and a detailed description thereof is omitted for the sake of clarity.

Figure 7:
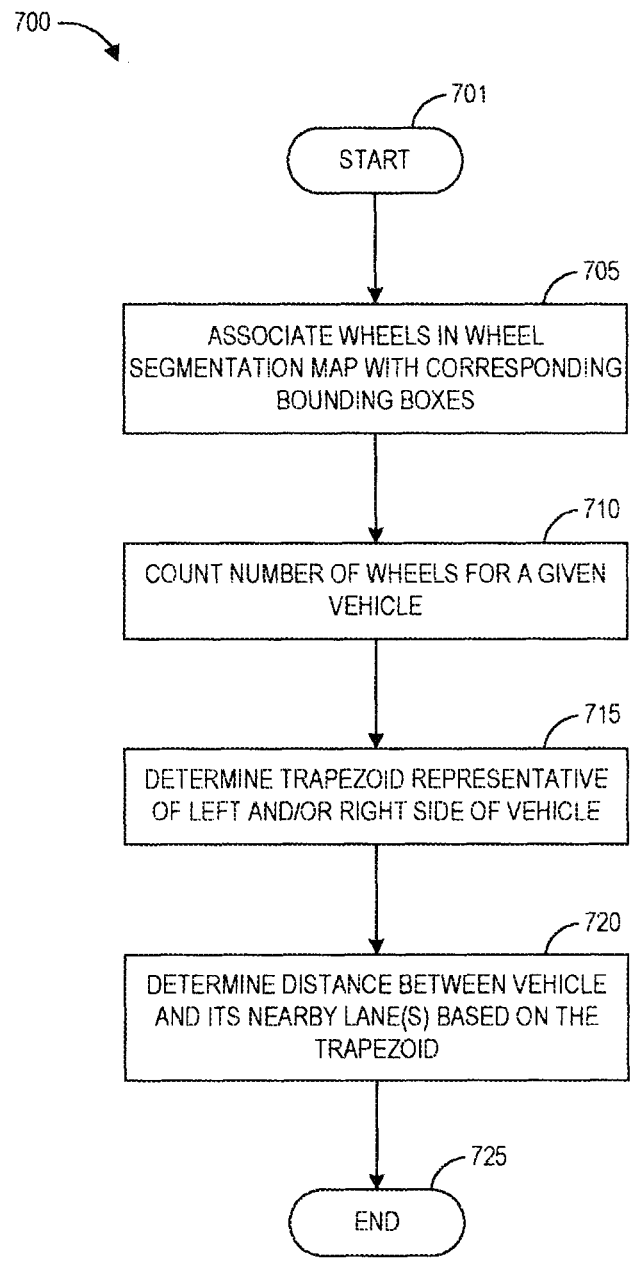
FIG. 7 is an example flow-chart illustrating another example method for determining the distance between a vehicle and lane(s) in accordance with aspects of this disclosure.

FIG. 7 is an example flow-chart illustrating another example method for determining the distance between a vehicle and lane(s) in accordance with aspects of this disclosure. The method 700 illustrated in FIG. 7 may be performed by an in-vehicle control system (such as the in-vehicle control system 150 of FIG. 1) or component(s) thereof. For example, the steps of method 700 illustrated in FIG. 7 may be performed by processor(s) and/or other component(s) of an in-vehicle control system or associated system(s). For convenience, the method 700 is described as performed by the processor of the in-vehicle control system.

In certain embodiments, the method 700 may include a number of steps performed by the processor in performing step 325 of method 300. Thus, the method 700 may comprise a technique for determining the distance between a vehicle detected within an image received from a camera and the vehicle's nearest lane(s) based on a wheel segmentation map and a lane segmentation map.

The method 700 begins at block 701. At block 705, the processor associates the wheels identified in a wheel segmentation map with corresponding bounding boxes of a bounding box map. For example, the processor may associate wheels detected in the wheel segmentation with the bounding box in response to the wheels at least partially overlapping the bounding box. In certain implementations, the wheel segmentation map is generated on a frame-by-frame basis based on images received from the camera. By associating the detected wheels with a given bounding box, the processor may be able to make certain determinations regarding the location of the detected wheels on the vehicle. For example, the processor may be able to determine whether a given wheel is a rear wheel or a front wheel of the vehicle and/or whether the wheel is a left-most wheel or a right-most wheel of the vehicle. In one implementation, the association of the wheels with the bounding boxes may include cropping an area in the wheel segmentation map corresponding to a selected bounding box from the bounding box map.

At block 710, the processor counts the number of wheels within the cropped area by calculating the number of groups of connected pixels within the cropped image. The processor may be further configured to determine the left and right sides of the vehicle based on the number of wheels detected within the cropped wheel segmentation map. In particular, the technique used to determine the distance between the vehicle and the nearby lane(s) may depend on the number of wheels, and their locations, within the bounding box. A number of example techniques depending on the number of wheels detected at block 710 are outlined below.

1. No Wheels are Detected within the Cropped Area

When no wheels are detected within the cropped area, the processor may infer that i) the vehicle is at least partially occluded by another object within the image, ii) the vehicle is beyond a threshold distance ahead of the ego vehicle, such that the wheels of the detected vehicle are not detectable based on the received image, or iii) the detected vehicle and bounding box are reflective of a false positive detection. Since no wheels are detected within the bounding box, the processor may set the left and right bottom corners of the bounding box to be indicative of the left and right sides of the vehicle.

2. Only One Wheel is Detected within the Cropped Area

When only one wheel is detected within the cropped area, the processor may infer that the vehicle is only partially in view. The processor may determine whether the vehicle is occluded when only one wheel is detected. Occlusion detection is performed based on comparing the position of the bottom edges of the two bounding boxes. If one edge is higher than the other, then the processor may determine that the corresponding vehicle is occluded. In response to determining that the vehicle is occluded, the processor may set the bottom left corner and bottom right corner of the bounding box to represent the left and right sides of the vehicle. In response to determining that the vehicle is not occluded, the processor may set the leftmost pixel and the rightmost pixel of the detected wheel to represent the left and right side of the vehicle. While the use of a single wheel may not be representative of the actual left and right sides of the entire vehicle, the distance between the detected wheel and the nearby lane(s) may still be useful. In certain embodiments, the processor may also provide an indication that only a single wheel has been used to determine the distance between the car and the nearby lanes when outputting the distance measurements.

3. Two Wheels are Detected within the Cropped Area

When two wheels are detected within the cropped area, the processor may treat each of the detected wheels separately as representing the left and right sides of the vehicle. For each wheel, the processor may determine the distance (e.g., based on the number of pixels) between the bottom pixel of each column of pixels in the detected wheel and the bottom edge of the 2D bounding box. Thus, the pixels which are closest to the bottom of the bounding box may indicative of the pixels being in contact with the road surface. In certain embodiments, the processor may take the average value (e.g., pixel location) of all columns of pixels that have the minimum distance to the bottom of the bounding box as representing either the left or right side of the vehicle.

4. More than Two Wheels are Detected within the Cropped Area

When more than two wheels are detected within the cropped area, the processor may select two of the detected wheels to be representative of the left and right sides of the vehicle. In one embodiment, the processor selects the wheels that have pixels located in the leftmost and rightmost columns. That is, the processor may select the wheels which are located at the leftmost and rightmost sides of the bounding box as the two wheels. However, when two or more wheels share pixels in the same column of pixels of the image, the processor may select the bottom-most wheel to represent the corresponding side (e.g., left or right side) of the vehicle. Once the processor has select two of the detected wheels, the processor may define the left and right sides of the vehicle in a manner similar to the above-described technique for when two wheels are detected within the cropped area.

Once the left and right sides of the vehicle have been determined based on the number of detected wheels as described above, the processor may, at block 715, determine a trapezoid representative of the left and/or right side of the vehicle. This may include, for example, the processor reducing the size of the bounding box to the shape of a trapezoid having two bottom vertices defined by the left and right sides of the vehicle as determined by block 710. The processor may determine the location of a given wheel based on the pixels of the wheel which are closest to the bottom of the image (or closest to the bottom of the corresponding bounding box). That is, the lowest portion of a detected wheel may be inferred to be in contact with the road surface (or at least close enough to the portion of the wheel in contact with the road surface for the purpose of estimating the wheel's position within its lane). When more than one pixels is determined to be the closest to the bottom of the bounding box (e.g., the pixels are in the same row), the processor may take the average value of the pixel locations for the pixels that are the closest to the bottom of the bounding box as the location of the wheel.

Embodiments of the trapezoids are illustrated in FIGS. 4B, 5B, and 6B. For example, as shown in FIGS. 4B and 5B, the trapezoids may be defined with respect to the bottom wheels detected for a given vehicle. In FIG. 7B, the bottom right wheel of the right side vehicle is not visible, and thus, the trapezoid may be defined based on the two left wheels detected.

At block 720, the processor determines the distance between the vehicle and its nearby lane(s) based on the trapezoid determined in block 715 and the lane segmentation map. In certain implementations, the processor may determine the coordinates of the pixels (e.g., the row and column for each of the pixels) representing the bottom two vertices of the trapezoid. For example, the bottom-left vertex of the trapezoid may have a coordinate (row r, column c) in the image. Continuing the example, for row r, the processor may obtain the corresponding values of all columns in the same row (e.g., row r) for the lanes identified in the lane segmentation map. The processor may then locate the individual lanes in the same row (e.g., row r) by selecting the center and edge pixels for each lane in the same row and sorting all of the selected centers and edges based on their column values. In certain implementations, the processor may determine the lane widths based on the center locations. The processor may compare the column values of the vertices of the trapezoid (e.g., the column value for the bottom-left vertex in the example) to the sorted center values for the lanes in the same row.

The processor may then determine the distance, in pixels, between the vertex and the closest lane centers to the left and right of the vertex. For each of the closest left and right lanes, the processor may also determine the ratio between the distance in pixels to the lane and the total lane width measured in pixels.

Depending on the location of a given vertex of the trapezoid, the location of the vertex can be classified into three main categories. The vertex may be: i) located on the closest lane (e.g., overlapping with the closest lane), ii) located between two lanes, or iii) one of the two closest lanes may be missing (e.g., at least partially occluded from view in the same row as the vertex or missing entirely from the image).

When a given vertex of the trapezoid is located on the closest lane, the processor may calculate a distance of 0 for the closest lane and a pixel distance equal to the lane width for the second closest lane. The processor may determine the ratio between the distance in pixels to the lane and the total lane width as 0 for the closest lane and 1 for the second closest lane.

When a given vertex of the trapezoid is located between lanes, the processor may calculate the distance between the pixels based on the absolute difference between the column coordinate of the vertex and the column coordinates of the centers of the nearest two lanes. The processor may determine the ratios based on the distances in pixels between the vertex and the lane centers and the lane width, measured in pixels, for the same row as the row of the vertex.

When one of the nearest lanes is missing for a given vertex of the trapezoid, the processor may output an indication that the distance to the missing side cannot be calculated. For example, the processor may output a value of −1 to be indicative of a missing lane. The processor may also provide an indication that at least one of the lanes is missing (e.g., by outputting a value of −1) for the ratio value since the width of the lane cannot be calculated. The method ends at block 725.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:
1. An in-vehicle control system comprising:
   a processor; and a computer-readable memory in communication with the processor and having stored thereon computer-executable instructions to cause the processor to:
  receive an image,
  identify a vehicle and a lane marker in the image,
  determine a bounding box for the vehicle within the image,
  determine a left and/or right side of the vehicle,
  reduce a size of the bounding box based on the left and/or the right side of the vehicle, and
  determine a distance between the vehicle and the lane marker using the bounding box with the reduced size.

2. The system of claim 1, wherein the memory further has stored thereon computer-executable instructions to cause the processor to:
  determine a number of wheels within the image that are associated with the vehicle,
  wherein the determining of the left and/or the right side of the vehicle is based at least in part on the number of wheels.

3. The system of claim 1, wherein the bounding box having the reduced size has a shape of a trapezoid.

4. The system of claim 3, wherein the trapezoid has two bottom vertices defined by the left and/or the right sides of the vehicle.

5. The system of claim 1, wherein the memory further has stored thereon computer-executable instructions to cause the processor to:
  determine a location of a wheel of the vehicle based on one or more pixels of the wheel in the image which are closest to a bottom of the image.

6. The system of claim 5, wherein the memory further has stored thereon computer-executable instructions to cause the processor to:
  in response to determining that two or more pixels of the wheel in the image are closest to the bottom of the image, average a location of the two or more pixels as the location of the wheel.

7. The system of claim 1, wherein the memory further has stored thereon computer-executable instructions to cause the processor to:
  determine a location of a wheel of the vehicle based on one or more pixels of the wheel in the image which are closest to a bottom of the bounding box.

8. The system of claim 1, wherein the memory further has stored thereon computer-executable instructions to cause the processor to:
  determine coordinates of pixels in the image representing bottom two vertices of the bounding box,
  wherein the determination of the distance between the vehicle and the lane marker is further based on the coordinates of the pixels representing the bottom two vertices of the bounding box.

9. The system of claim 1, wherein the memory further has stored thereon computer-executable instructions to cause the processor to:
  determine a center pixel representing the lane marker in the image,
  wherein the determination of the distance between the vehicle and the lane marker is further based on the center pixel representing the lane marker.

10. A non-transitory computer readable storage medium having stored thereon instructions that, when executed, cause at least one computing device to:
  receive an image;
  identify a vehicle and a lane marker in the image;
  determine a bounding box for the vehicle within the image;
  determine a left and/or right side of the vehicle;
  reduce a size of the bounding box based on the left and/or the right side of the vehicle; and
  determine a distance between the vehicle and the lane marker using the bounding box with the reduced size.

11. The non-transitory computer readable storage medium of claim 10, wherein the non-transitory computer readable storage medium further has stored thereon instructions that, when executed, cause at least one computing device to:
  generate a wheel segmentation map representative of at least one wheel in the image, wherein identifying the vehicle in the image is based at least in part on the wheel segmentation map; and
  generate a lane segmentation map representative of the lane marker detected in the image, wherein identifying the lane marker in the image is based at least in part on the lane segmentation map.

12. The non-transitory computer readable storage medium of claim 10, wherein the non-transitory computer readable storage medium further has stored thereon instructions that, when executed, cause at least one computing device to:
  determine a number of pixels separating a bottom vertex of the bounding box and the lane marker,
  wherein the determination of the distance is further based on the number of pixels.

13. The non-transitory computer readable storage medium of claim 12, wherein determining the number of pixels separating the bottom vertex and the lane marker comprises determining the number of pixels separating the bottom vertex and a center of the lane marker in a same row of pixels as the bottom vertex.

14. The non-transitory computer readable storage medium of claim 13, wherein the non-transitory computer readable storage medium further has stored thereon instructions that, when executed, cause at least one computing device to:
  detect a group of pixels representing the vehicle in the image; and
  determine, in response to a detection of no wheels within the group of pixels, that the vehicle is at least partially occluded in the image.

15. The non-transitory computer readable storage medium of claim 10, wherein the non-transitory computer readable storage medium further has stored thereon instructions that, when executed, cause at least one computing device to:
  identify at least one wheel in the image associated with the vehicle,
  wherein the determination of the distance is further based on the identified at least one wheel.

16. The non-transitory computer readable storage medium of claim 15, wherein the non-transitory computer readable storage medium further has stored thereon instructions that, when executed, cause at least one computing device to:
  determine an absolute distance between the at least one wheel and the lane marker; and
  determine a ratio between the absolute distance and a width of a lane associated with the lane marker.

17. A method for determining the distance between a vehicle and a lane, comprising:
  receiving an image;
  identifying a vehicle and a lane marker in the image;
  determining a bounding box for the vehicle within the image;
  determining a left and/or right side of the vehicle;
  reducing a size of the bounding box based on the left and/or the right side of the vehicle; and determining a distance between the vehicle and the lane marker using the bounding box with the reduced size.

18. The method of claim 17, further comprising:
determining a predicted behavior of the vehicle based on the distance.

19. The method of claim 18, further comprising:
determining a confidence level that the vehicle will perform the predicted behavior.

20. The method of claim 19, further comprising:
controlling an autonomous vehicle based on the predicted behavior and the confidence level.

* * * * *